United States Patent
Singhal

(10) Patent No.: US 8,681,486 B2
(45) Date of Patent: Mar. 25, 2014

(54) APPARATUS AND METHOD FOR ADDITIONAL SCREEN IN A PORTABLE COMPUTING AND COMMUNICATION DEVICE

(76) Inventor: Tara Chand Singhal, Torrance, CA (US)

( * ) Notice: Subject to any disclaimer, the term of this patent is extended or adjusted under 35 U.S.C. 154(b) by 266 days.

(21) Appl. No.: 13/136,135

(22) Filed: Jul. 24, 2011

(65) Prior Publication Data

US 2013/0021734 A1      Jan. 24, 2013

(51) Int. Cl.
*G06F 1/16* (2006.01)
(52) U.S. Cl.
USPC ............ 361/679.04; 361/679.05; 361/679.26; 248/917
(58) Field of Classification Search
USPC ...................................................... 361/679.26
See application file for complete search history.

(56) References Cited

U.S. PATENT DOCUMENTS

| | | | | |
|---|---|---|---|---|
| 6,118,436 A * | 9/2000 | Kushita | ........................ | 345/173 |
| 6,295,038 B1 * | 9/2001 | Rebeske | ........................ | 345/1.1 |
| 6,700,773 B1 * | 3/2004 | Adriaansen et al. | ..... | 361/679.08 |
| 6,859,219 B1 * | 2/2005 | Sall | ................................ | 345/1.1 |
| 7,342,776 B1 * | 3/2008 | Chan | ........................ | 361/679.27 |
| 7,830,333 B2 * | 11/2010 | Aoki | ............................. | 345/1.3 |
| 7,965,258 B2 * | 6/2011 | Aoki | ............................. | 345/1.3 |
| 8,385,992 B2 * | 2/2013 | Davidson et al. | .......... | 455/575.4 |
| 8,411,427 B2 * | 4/2013 | Jeong et al. | ............. | 361/679.27 |
| 2003/0095373 A1 * | 5/2003 | Duquette | ..................... | 361/681 |
| 2005/0253775 A1 * | 11/2005 | Stewart | ........................ | 345/1.1 |
| 2006/0082518 A1 * | 4/2006 | Ram | ............................. | 345/1.1 |
| 2006/0268500 A1 * | 11/2006 | Kuhn | ............................ | 361/683 |
| 2007/0086154 A1 * | 4/2007 | Koch | ............................ | 361/681 |
| 2007/0152113 A1 * | 7/2007 | Okuley et al. | ................ | 248/133 |
| 2007/0247798 A1 * | 10/2007 | Scott | ............................. | 361/683 |
| 2009/0009423 A1 * | 1/2009 | Huang et al. | .................. | 345/1.1 |
| 2011/0002096 A1 * | 1/2011 | Thorson | ................... | 361/679.04 |
| 2012/0147535 A1 * | 6/2012 | Ahn et al. | ................ | 361/679.01 |

* cited by examiner

*Primary Examiner* — Anthony Q Edwards
(74) *Attorney, Agent, or Firm* — Steve Roeder Esq.

(57) ABSTRACT

A portable computing and communication device has a main display screen and an additional display screen attached to the backside of the device body, wherein the backside stores and hides the additional display screen when not in use. The additional screen slides out with the help of a slide mechanism on one side from the device body to provide an additional display screen for use with the device. The additional screen has hinge mechanism that enables the additional screen to be oriented at multiple angles relative to the main screen, when slid out from the backside of the device, enabling a book orientation, a laptop orientation or a large screen orientation to be formed between the main screen and the additional screen.

20 Claims, 10 Drawing Sheets

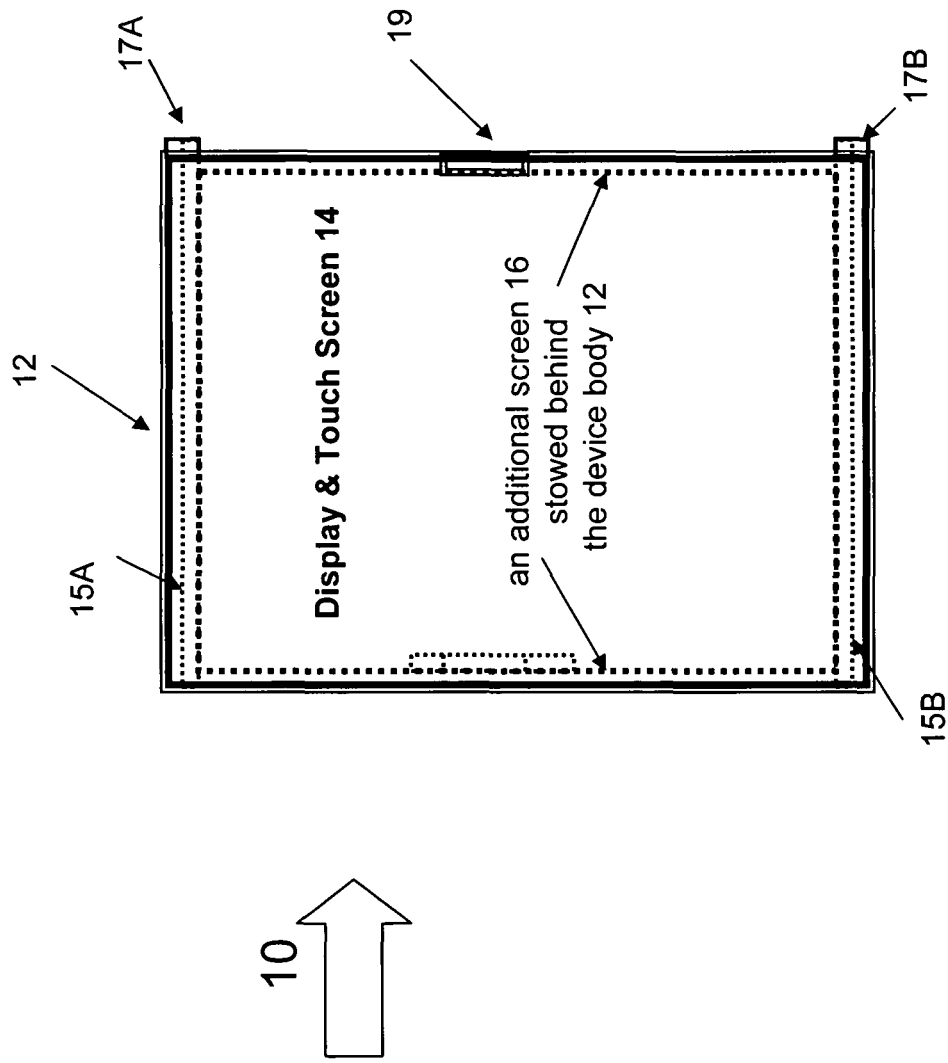

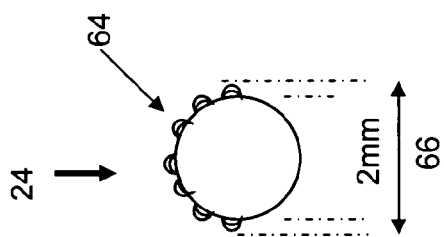
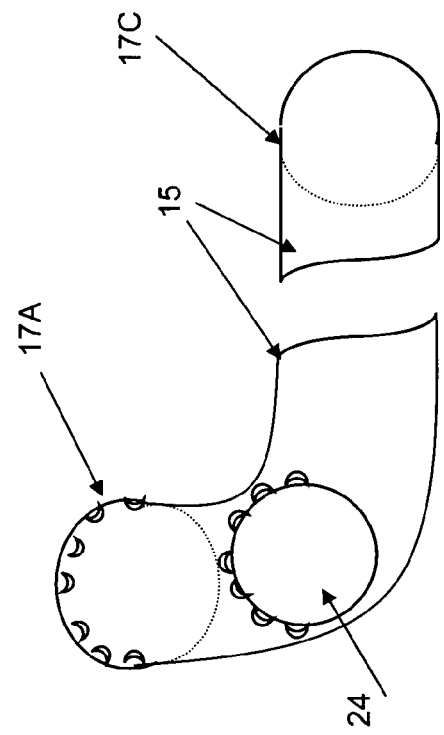
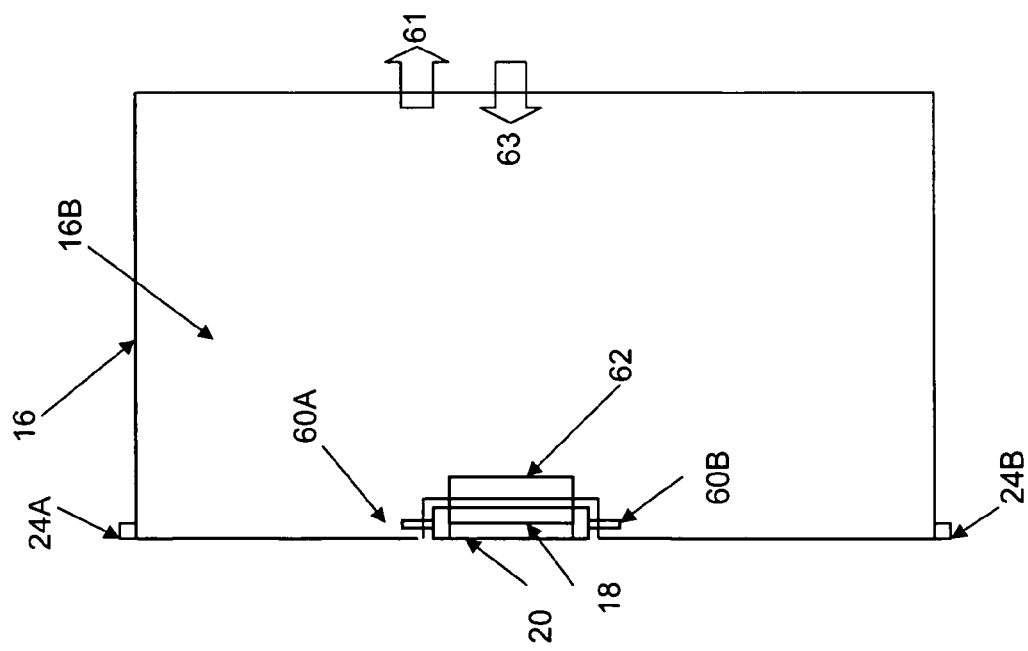

| providing a device body with dual screens, with a main screen on the body and an additional stow away display screen that is stowed behind the body.   100 |
| --- |
| enabling either the main screen or both the main screen and the additional screen when deployed to be used as display screens.   102 |
| hinging the additional screen at different angles to the main screen providing different use formats of the device.   104 |
| hinging the additional screen when fully slid out to be hinged at an angle relative to the main screen, enabling a large screen orientation, a book orientation, or a laptop orientation to be formed between the main screen and the additional screen.   106 |
| providing a storage mechanism in the device body for storing the additional screen when not in use.   108 |
| sensing a use and a stow states of the additional screen by an operating system function operating in the device, and programming the display logic of the operating system to use or not use both the screens for display.   110 |
| using the main screen touch screen to function as a control mechanism and the additional screen as an additional display screen space, by an operating system function.   112 |

Figure 5B

APPARATUS AND METHOD FOR ADDITIONAL SCREEN IN A PORTABLE COMPUTING AND COMMUNICATION DEVICE

CROSS REFERENCE

None

FIELD OF THE INVENTION

Apparatus and method for an additional display screen in a portable computing and communication device are described. The additional screen is deployed for use from storage behind the computing device.

BACKGROUND

In the last few years, portable computing and communication devices in the form of smart phones, tablet computers and e-book readers have become very common. Examples of such devices are IPhone® and IPadD® from Apple Computer Company. Many other companies such as, Samsung, Motorola, RIMM among many others also manufacture and market similar devices. Then there are examples of computing and communication devices for e-book readers such as Kindle® from Amazon and Nook® from Barnes and Noble.

An important feature of all of these computing and communication devices is that they provide a single screen that functions both as a display screen and as a touch screen for control and command functions for the device. These single screen devices have limited screen space based on their form factors and intended applications. For example IPhone has a screen size of 2.5 by 3.5 inches and the IPad has a screen size of 6.0 by 7.5 inches. Similar devices from other companies have different screen sizes that are somewhat larger than the IPhone and somewhat smaller than the IPad.

These portable devices primarily function and are driven by the display of content on the screen. The screen size of these devices along with their weight becomes an important factor in the versatility of the use of these devices.

Hence, it is the objective of the embodiments herein to be able to provide larger or additional screen sizes in the same form factor of the devices to be able view larger display content or more display content. It is further the objective to provide for an improved use of such devices for different uses and formats that would make them more versatile for the users of these devices.

SUMMARY

Portable computing and communication devices such as, IPhone and IPad have a single display screen. The embodiments described herein provide an additional display screen attached to the backside of the device body such that the backside of the device stores and hides the additional display screen when not in use.

In a preferred embodiment, the additional display screen slides out from the backside of the device body on a side of the device body with the help of a slide mechanism to provide an additional display screen for use with the device.

The additional screen, when it is deployed for use, has a hinge mechanism that enables the additional screen to be hinged at multiple angles relative to the main screen. This feature enables the device to be used as a two page book use-format, a laptop use-format, a large screen use-format or as a presentation use-format, where these various use-formats are formed by use of the main screen and the additional screen.

When the use of the additional screen is not desired or required by a user, the additional screen is slid back into the backside of the device body for storage and thereby hidden behind the device body. The device then is returned to its original form factor and manner of use.

The additional screen is relatively much thinner, on the order of a few mm, than the device body with the main display screen, that is, on the order of a centimeter, as the additional screen provides only a display screen. That is, the device with the additional screen maintains the same desirable form factor of the device, while adding an additional display screen that is only deployed when used.

It is believed, these features, of an additional display screen in portable computing and communication devices provide a more user friendly and efficient viewing of digital content on the limited size screens of the portable handheld devices.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIGS. 1A, 1B, 1C and 1D are block diagrams that illustrates features of the present embodiments of the invention of additional screen in stowed, deployed and different use-format states in a portable computing and communication device;

FIG. 4A is block diagram of an electrical interface with a swivel hinge mechanism positioned on the additional screen;

FIGS. 4B-4C are block diagrams of a sprocket rod for hinges on the additional screen and its use inside the slide channel;

FIG. 5B is a method diagram that illustrates features of the present embodiments of the invention.

DESCRIPTION

Figure 1B:
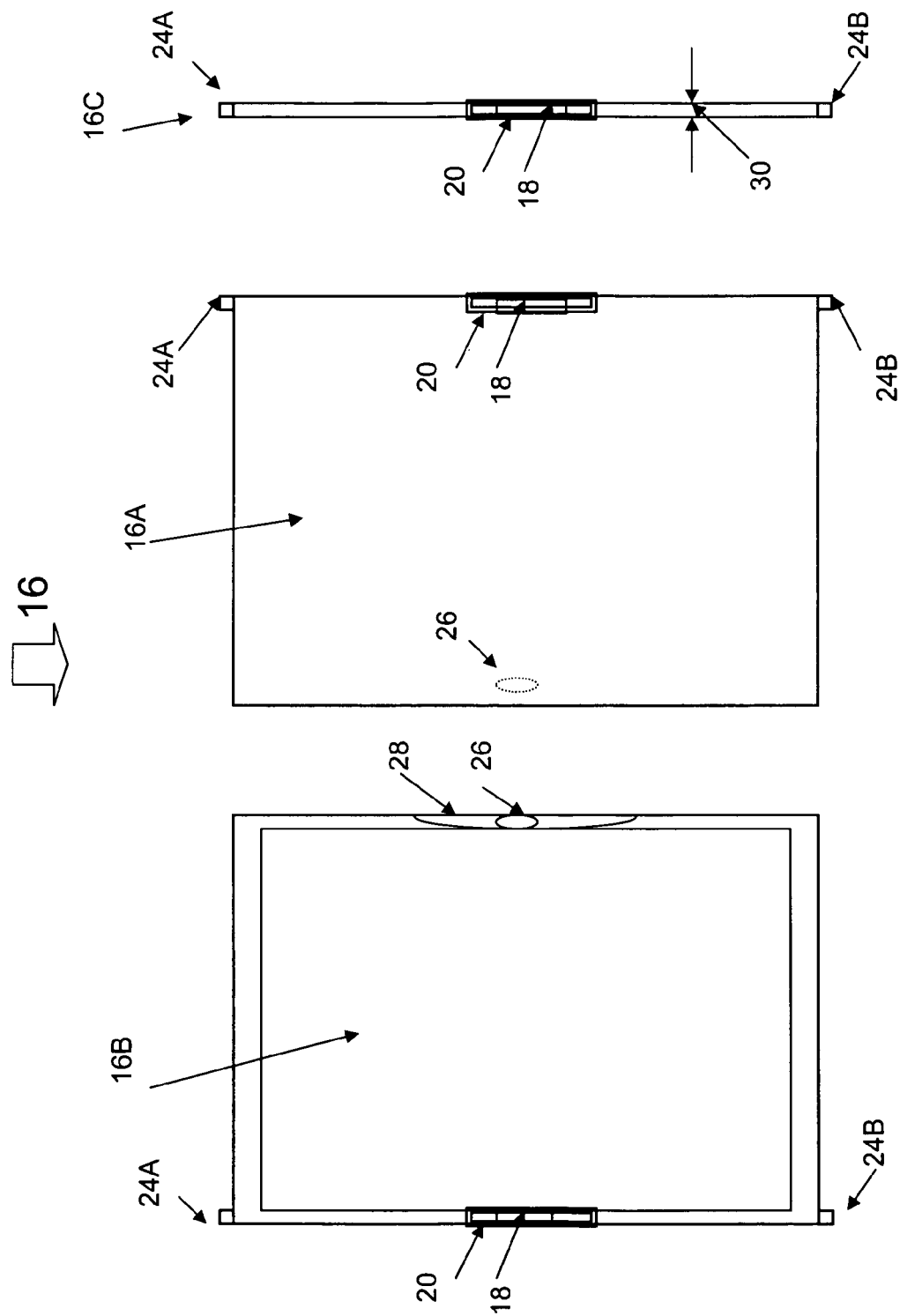

Introduction:

With reference to FIG. 1A in a preferred embodiment, a portable wireless computing and communication device 10 has a body 12, with a main screen 14 on the front side and an additional screen 16 that is stowed on the backside of the device body 12. Guide channels 15A and 15B on the topside and bottom side respectively, on the backside of the device 12, guide the movement of the additional screen 16 for storage and deployment.

The guide channels 15A and 15B have channel ends 17A and 17B that provide for the additional screen 16 to be held in place when deployed. The device body 12 has an electrical interface 19 that is used to electrically couple the additional screen 16, when the additional screen is deployed. These and other features of the device 10 are described with the help of the headings as follows.

Additional Screen 16

With reference to FIG. 1B, the details of the additional screen 16 are illustrated. The additional screen 16 is shown with a back side view 16A, the screen side view 16B and an edge view 16C. The screen 16 is equipped with two fulcrum rods 24A and 24B at the top and bottom of the screen 16 as shown.

The screen 16 also has an electrical interface 18 in a swivel hinge 20. The electrical interface 18 is for mating with the electrical interface 19 on the device body 12, as shown in FIG. 1A.

The additional screen 16 also has a latch indent 26 for latching it in place for storage behind the device 12. The screen 16 also has a finger grab 28 on the edge of the screen for ease in grabbing the screen 16.

The screen 16 has a thickness 30 that is approximately 2 to 2.5 mm based on the belief that a pure display screen would have such a depth or thickness. In contrast, the device body 12 incorporates inside it an integrated circuit with a display and touch screen, battery and speakers etc. and the device has a thickness of 8 mm based on the popular IPhone and IPad models.

Figure 1C:
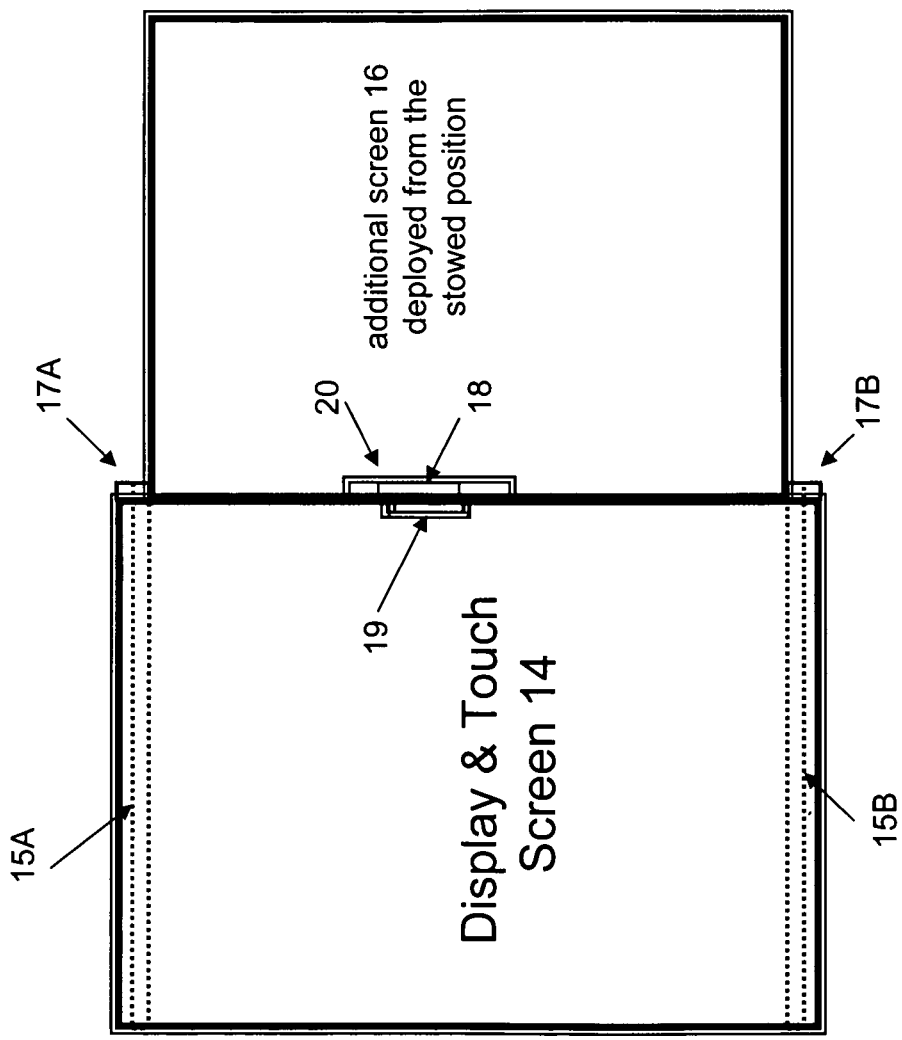

With reference to FIG. 1C, the additional screen 16 is deployed for use by it being pulled it out from behind the device body 12 from a stowed position. The channels 15A and 15B and channel ends 17A and 17B enable the additional screen 16 to be deployed next to the main screen 14 of the device 10

Additional Screen Use-Formats

Figure 1D:
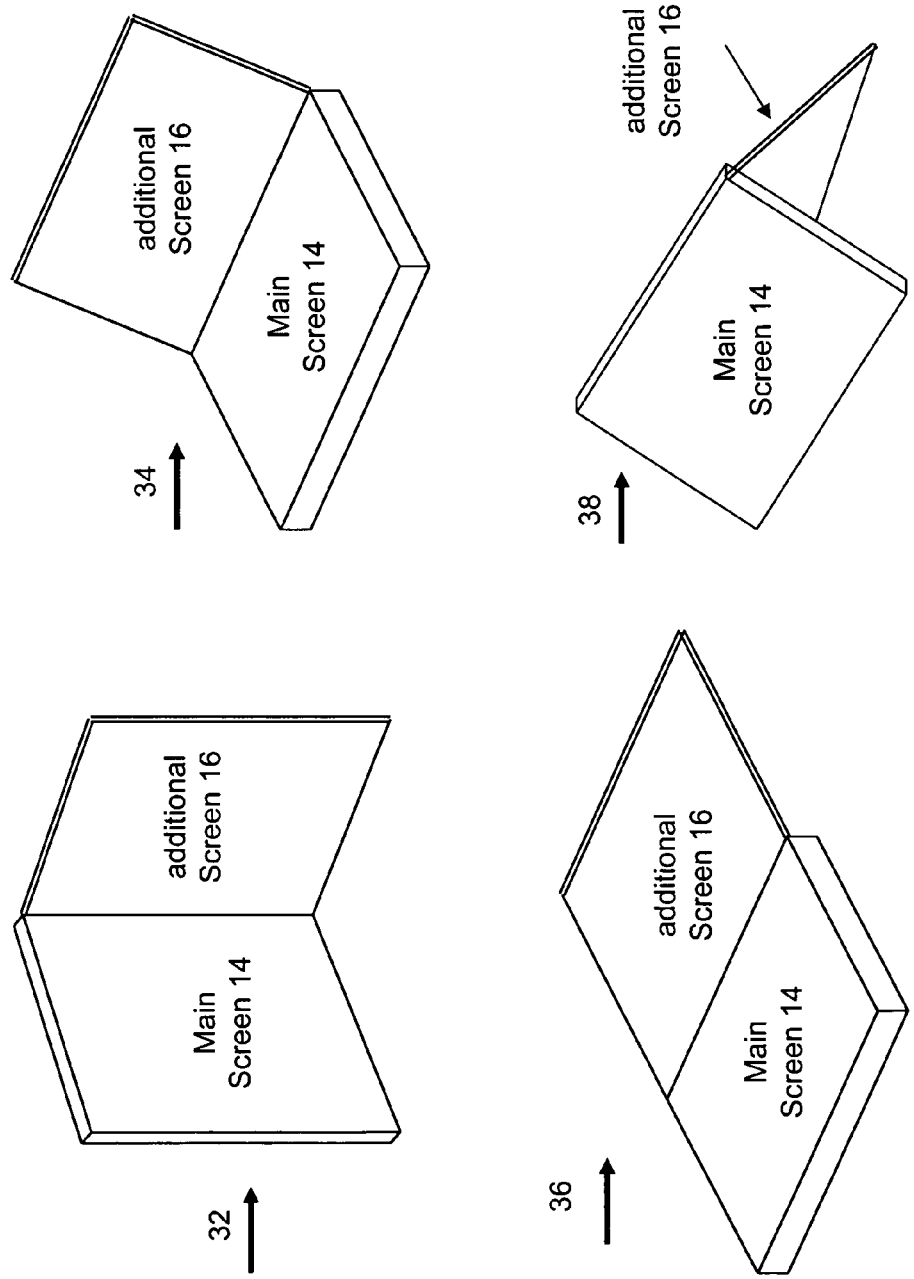

As shown in FIG. 1D, the additional screen 16 in conjunction with the main screen 14 may be used in different use-format. Four different use-formats are illustrated. A use-format 32 is for a two page e-book reading format, a use-format 34 is for a laptop use-format, a use-format 36 is for a large screen format, and a use-format 38 is for a presentation format. In the presentation format, two people can sit on the opposite side of a table and the presenter can see and control the presentation via the main screen 14 and the person being presented would see the display on the additional screen 16.

For these different formats of use as illustrated above, the hinge 20 on the additional screen 16 provides for hinge rotation of substantially 180 degrees that would allow for the additional screen 16 to be hinged from an angle of 90 degrees to an angle of 270 degrees relative to the main screen 14. Other hinge angles and use-formats are possible and are not ruled out.

Additional Screen 16 Storage Mechanism

Figure 2:
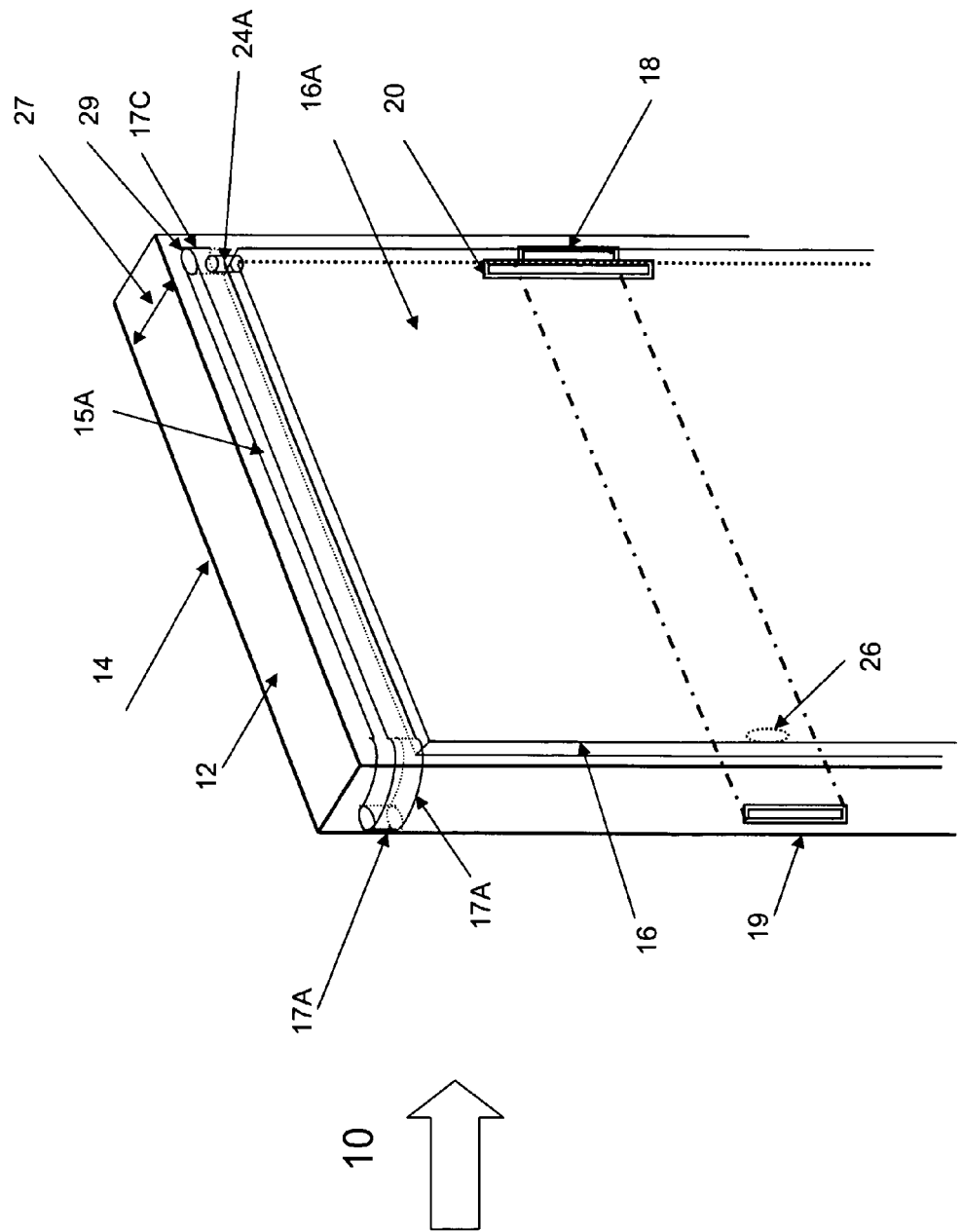
FIG. 2 is a perspective view diagram that illustrates features of the present embodiment of the invention for a slide and storage mechanism at the back of the device for an additional screen.

With reference to FIG. 2, a perspective view is shown of the backside of device body 12. What is shown is an additional screen 16 in a stored or stowed position, the top channel 15A, and the top channel end 17A. The top channel 15A is U-shaped with the open side facing downward. Also shown is the top rod 24A that is permanently attached to the top right edge of the screen 16, where the rod 24A is engaged in the channel end 17C of the channel 15A. In this partial figure, the corresponding other ends of these parts, such as, bottom channel 15B, bottom channel end 17B, bottom rod 24B, and the channel end 17D are not shown.

The channel 15A is straight behind the device body 12; however, the channel 15A curves towards the channel end 17A that is shown on the left side of the device body 12. The channel end 17A is curved to accommodate the movement of the rod 24A and to position screen 16 at the same level as the main screen 14. Further, the height of the U-shape channel end 17A is less than the channel depth behind the device body 12 to accommodate the screen 16 to be pulled out and moved up the channel end 17A to be positioned at the same level as the main screen 14 with the help of the rod 24A.

The channels 15A and 15B along with their left top and bottom ends 17A and 17B and right top and bottom ends 17C and 17D are rigidly attached on the backside of the device body 12 and are positioned at or near the top and bottom end of the device body 12, but a distance away from the rear facing camera that some of these devices have, usually at a top right corner of the backside of the device.

The channels 15A and 15B are positioned at a vertical distance from each other that is the same as the height of the additional screen 16 so that the rods 24A and 24B would engage inside the channels 15A and 15B, along with a part of the screen 16 itself inside the channels 15A and 15B. Thus, the channels 15A and 15B and the rods 24A and 24B guide the movement of the additional screen 16 inside the channels 15A and 15B, until the screen 16 is pulled all the way out and is ready to be moved into in the channel ends 17A and 17B.

The electrical interface 19 on the device body 12 and the electrical interface 18 on the additional screen 16, along with their alignment to mate with each other, are also shown, where the electrical interface 18 is inside of the hinge swivel 20 on the screen 16.

The notional dimensions of the additional screen 16 may include rod 24 of 2 mm diameter and 3 mm in height. The depth of the channel 15 may be 6 mm. Such a channel depth allows the rod 24 and the part of the screen 16 to be inside the channel 15 for easy guide and movement. The rod 24 may be made of a glide smooth plastic and the channel 15 may also be made of metal or glide smooth plastic.

As shown in FIG. 2, the screen 16 thickness 29 may be of the order of thickness 2 mm and the device 12 thickness 27 may be of the order of 8 mm. This screen thickness 29 may include a glass layer of 1 mm, a display layer of ½ mm and a metal casing thickness of ½ mm making for a 2 mm thick screen. The bezel of the screen may be 3 mm to 6 mm depending on the type of the device.

Additional Screen 16 Deployment Mechanism

Figure 3A:
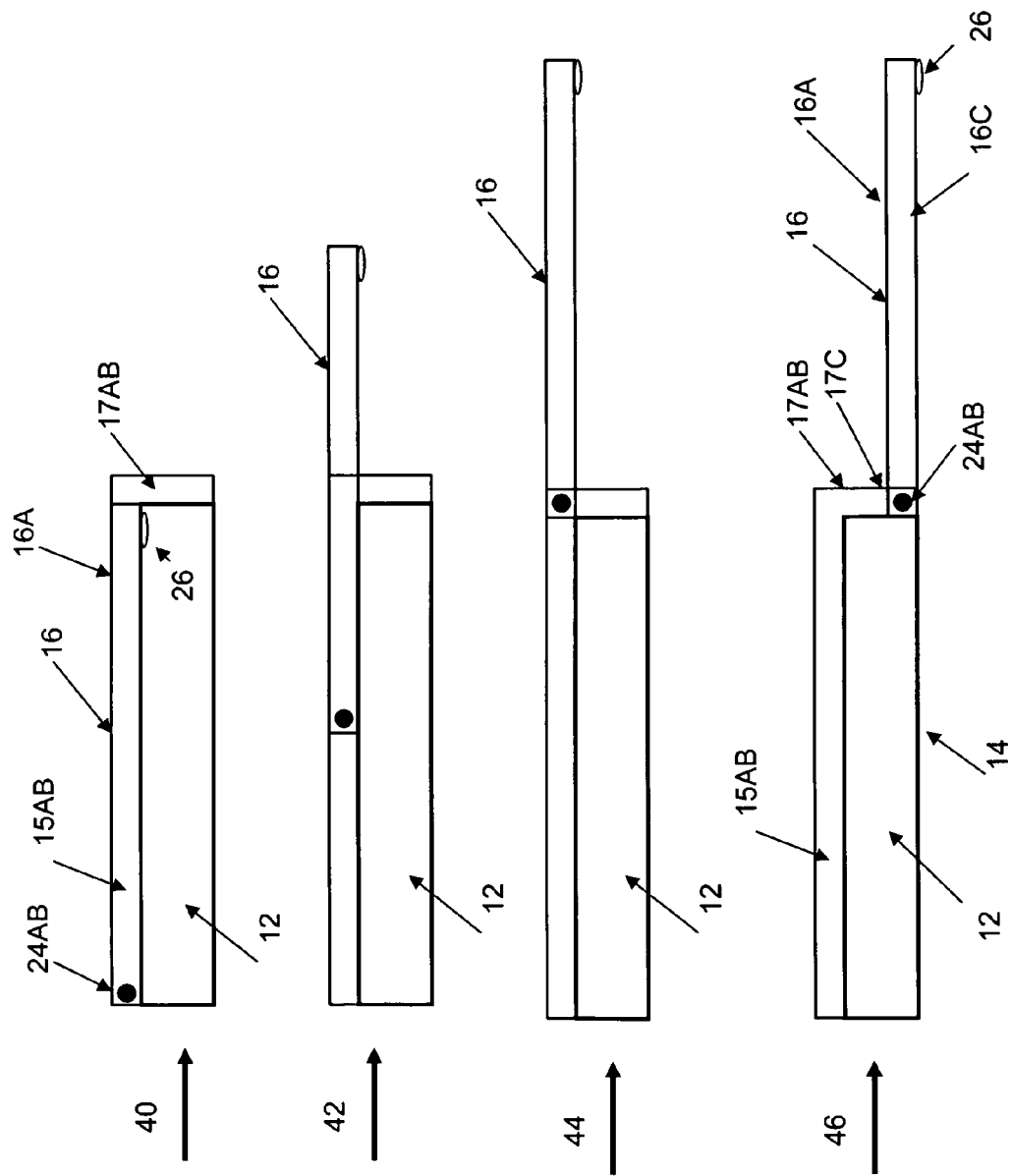
FIGS. 3A and 3B are a block diagram of plan views that illustrates features of the present embodiment of the invention of storage, deployment and use of the additional screen.

With reference to FIG. 3A, plan views of the device body 12 with the additional screen 16 are shown in different stages of deployment of the screen 16 from the stored or stowed position. The plan view 40 shows the screen 16 stowed, the plan view 42 shows the screen 16 pulled out halfway through, view 44 shows the screen 16 fully pulled out and view 46 shows the screen 16 to be moved in position in the channel edge 17A and 17B to be in their locked positions.

Figure 3B:
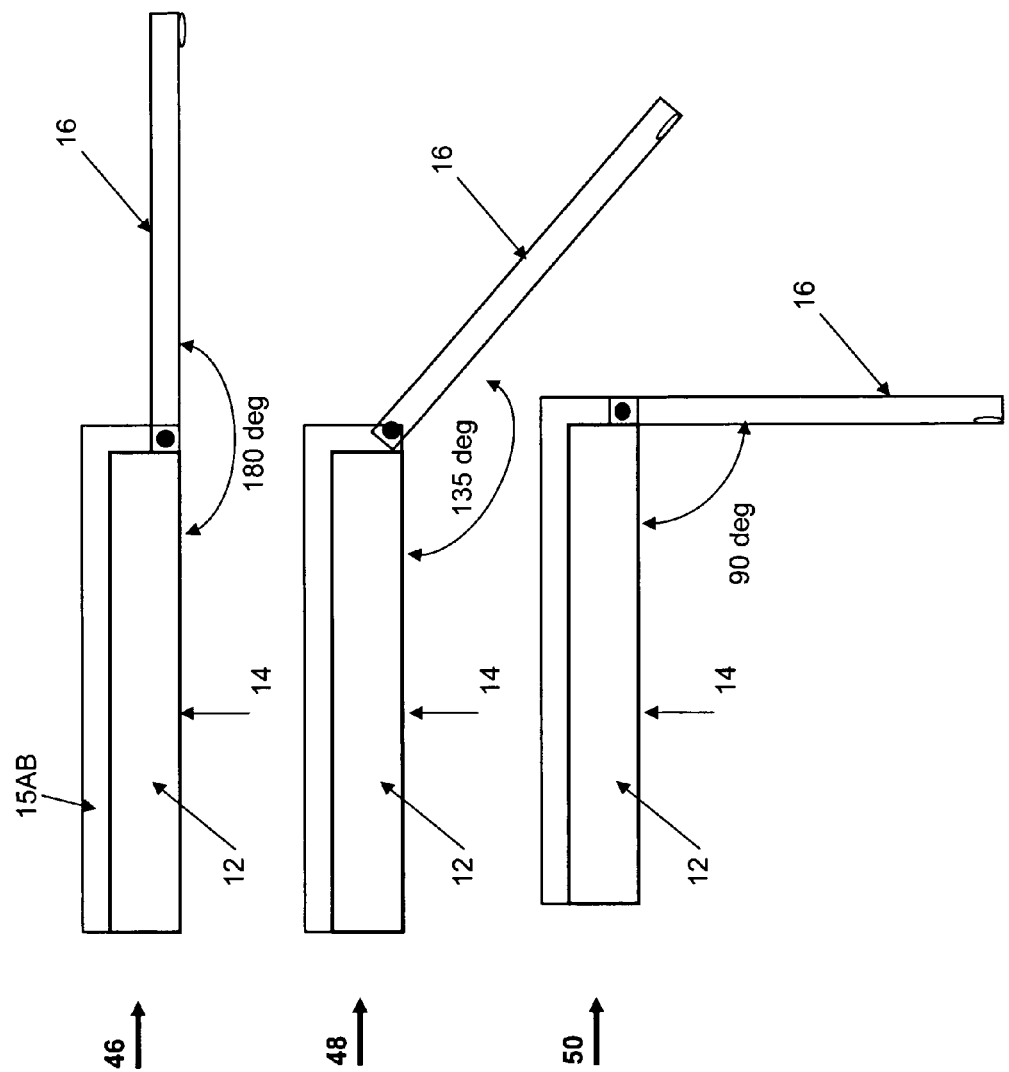

With reference to FIG. 3B, the view 46 shows that the additional screen 16 is at a 180 degree angle relative to the main screen 14. View 48 shows that the screen 16 is hinged up to be at 135 degree angle relative to the main screen 14, and view 50 shows that the screen 16 is hinged up to be at 90 degrees angle relative to the main screen 14. Other hinge angles are possible with the help of the hinge mechanism as illustrated later with reference to FIGS. 4A, 4B and 4C.

Alternative Channel Embodiment

An alternative embodiment is described that does not require channels 15A and 15B. This embodiment is not specifically illustrated and may also be understood with the help of FIG. 2. That is, in this embodiment the channels 15A and 15B are not there behind the device body 12. Instead, this embodiment uses only the two channel ends 17A and 17C on the top and two channel ends 17B and 17D at the bottom.

In this embodiment, the screen 16 is stowed or stored behind the device using the rods 24A and 24B that are pushed inside the channel ends 17C and 17D on the right side of the screen 16 and left side of the screen 16 is latched to the device body 12 with the latch 26. The screen 16 is removed from its storage position by prying open the latch 26 and then screen 16 is physically separated from the device body 12 by pulling out and removing the rods 24A and 24B from the channel ends 17C and 17D. The screen 16 is then directly engaged with the channel ends 17A and 17B with the help of rods 24A and 24B and pushed in position to make the electrical contact with the device 10.

Screen Hinge Mechanism 20

With reference to FIG. 4A, the screen 16 is shown with the backside 16B. The electrical interface 18 is shown on the left side of the screen 16. The electrical interface 18 includes a socket that would mate with the socket 19 on the device body and an interface ribbon 62 that connects the socket to the screen 16 electronics. That is, the ribbon 62 interfaces the hinge 18 with the screen 16.

A swivel hinge 20 is shown with pins 60A and 60B between the hinge 20 and the screen 16 that enable the hinge 20 to rotate inside the screen 16. For deployment of the screen 16, the screen 16 is pulled out 61 from the stowed position and when aligned next to the main screen 14 is pushed 63 to mate the screen 16 electrical interface 18 with the device electrical interface 19 (not shown here). The combination of the rods 24A and 24B inside the channel ends 17A and 17B and the hinge 20 enable the screen 16 to be hinge at variable angles relative to the screen 14.

In an alternative embodiment of the electrical interfaces 18 and 19 on the screen 16 and the device body 12 respectively, these may be wireless interfaces. The screen 16 may be powered by its own rechargeable batteries. While potentially making the electrical signal interface easier or more convenient, this alternative adds the cost of adding batteries to the addition screen 16. Such electrical interfaces that may be optical or short distance RF are prior art. Such embodiments are not ruled out.

With reference to FIGS. 4B and 4C, plan views are shown of the rod 24 and its use in the channel 15. The two ends or the far ends of the top channel 15A are identified as channel ends 17A and 17C. The two ends of the bottom channel 15B (not shown) are identified as 17B and 17D.

As shown in FIG. 4B, the rod 24 has sprockets 64 at the circumference that mate with reverse sprockets on the inside of the channel end 17A. The sprockets 64 allow the screen 16 to be oriented at one of the hinge angles permitted by the sprockets and moved between different angles based on the use-format desired as had been illustrated in FIG. 1D.

FIGS. 4A, 4B and 4C are illustrative of the preferred embodiment of the hinge mechanism. However any suitable prior art mechanism may also be used. Design of laptops provides for similar hinge and electrical interface mechanisms that may be adapted and modified for use for the additional screen embodiment described herein.

Device 10 Operating System (OS) Functions

Figure 5A:
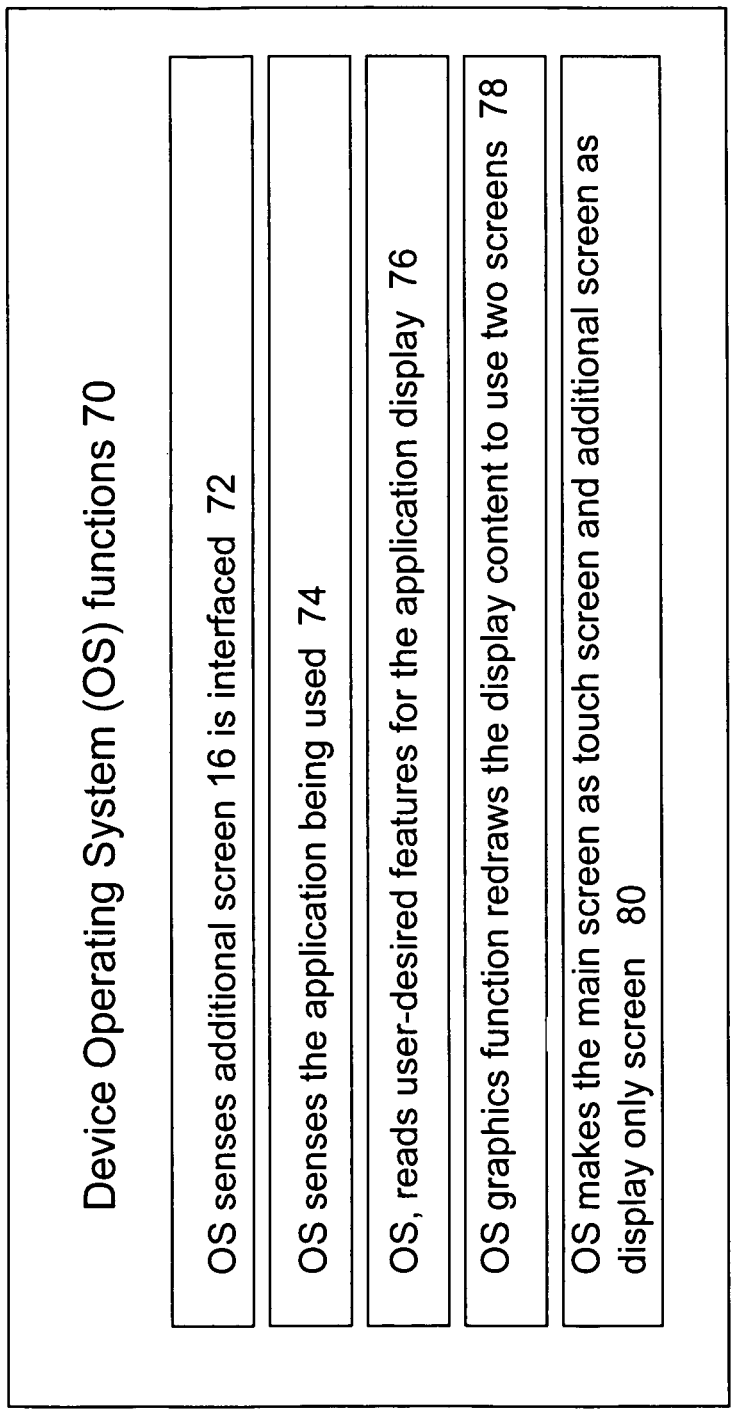
FIG. 5A is a function diagram that illustrates features of the present embodiments of the invention for an Operating System of the device.

With reference to FIG. 5A, the device 10 operating system functions 70 are illustrated. The OS provides functions that include, (i) OS senses that an additional screen 16 is interfaced to the device 72, (ii) OS senses the specific application being used 74, (iii) OS, reads user desired features for the application display 76, (iv) OS graphics function redraws the display content to use two screens 78, and (v) OS makes the main screen as touch screen and additional screen as display only screen 80.

The technology of the OS functions as described above is prior art. Such prior art technology may be adapted to provide the functions as described above. The function 78 that redraws single screen graphics for dual screen graphics is described in more detail below with the help of the different Modes of Operational Use.

Modes of Operational Use

A user activates a portable computing and communication device such as a smart phone, an e-book reader, or a tablet computer that is equipped with the additional screen of the embodiments herein but such a screen is stored behind the device. The user is using an application on these devices and while using that application, the user then decides that the user would rather have the benefit of an additional screen for display.

The user pries the end of the screen 16 from behind the device and pulls out the screen 16 and positions the screen 16 next to the main screen 14, and pushes the screen 16 against the device 12 body that electrically engages the screen 16 to the device body 12. The user then decides to use the hinge 20 on the screen 16 to rotate the screen 16 to be in one of the desired use-formats. These operations with the screen 16, it is believed, are likely to take a matter of few seconds only.

The device OS senses that the screen 16 is available and depending upon the application being used and depending upon the user preference parameters, instantly redraws the screen display graphics to use the two screen format for display of the digital content.

When the user decides he/she no longer needs the two screen format, the user un-rotates the screen to align with the main screen and pulls the screen 16 away from the device 12 to disengage the electrical interface and then moves the screen 16 back to the stow/storage position and latch the screen 16 behind the device body.

Alternatively, the user may deploy the screen 16 before activating the device, knowing in advance what use two screen format is desired. After the additional screen 16 is deployed in the desired use-format, then the user activates the device 10. In this mode, the OS automatically configures the display for the two screen format before any application is used.

The user may have the options to program preference parameters on how the main screen 14 and screen 16 would be used for different application such as reading web pages, e-mail, messages, or text or graphics such as pictures. The prior art OS has features that allow display preference parameters to be programmed in the device. Such user preference parameters may be different for different types of devices such as smart phones, e-book and tablet computers.

For a smart phone use, the user may use the additional screen to split the display content such that control and selection features remain in the main screen and the content display may be in the screen 16. As a simplified illustration, a list of items may be displayed on the main screen 14 and the content of the selected list item may be displayed on the screen 16. As another illustration, for entry of text, for messages and e-mail, the keyboard may be shown on the main screen 14 and the typed text may be shown on the screen 16. Thus, allowing for a larger space to display a keyboard and related controls, as well as the typed in text. Such larger control and display space may also allow for a pallet of controls for Draw programs such as PowerPoint®.

In a smart phone that provide for a single screen, since the screen size is limited, a partial content is usually displayed on the main screen that requires the user to switch back and forth between two partial screen displays. One example of this is in the display of the keyboard where the keyboard is split between the alphabetic keys and the number and punctuation keys. The two screen mode allows the full keyboard to be displayed on the main screen and the typed content to be displayed on the additional screen. Another example may be search functions where the search screen may be displayed on the main screen and the search item content may be displayed on the additional screen. Thus, allowing a user to scroll through a list and at the same time see the scrolled item content being displayed on the additional screen. These are only some of the illustrations and there would be many more such illustrations in how the smart phones are used for applications such as music, video, and multimedia with a dual screen format of the embodiments herein.

In a tablet mode such as IPad, the additional screen may be used in an e-book reader format enabling two pages to be displayed simultaneously. Further many magazine and newspapers are likely to be delivered via wireless to these tablet computers. The additional screen 16 when needed would make the reading of such books, magazines and news papers to be displayed in their close to original format along with their embedded photographs and videos. In one of the use-formats 46 as shown in FIG. 1D, the screens are used to provide a larger screen format.

The additional screen 16 also permits a presentation format where two people, one making the presentation and one receiving the presentation would sit opposite each other and use the two screen mode, where the device is propped up on a table in a presentation format 48 as shown earlier in FIG. 1D.

As shown in FIG. 1D, E-book readers 42 may use the additional screen to enjoy a true book reading format for displaying and reading two pages side by side enabling a larger or true font size for reading.

The OS function 76 as in FIG. 5A would adjust and reformat the display content for the two screens. Such functions of the OS are prior art and are commonly used when two screens are used side by side with a single desk top computer.

The screens 14 and 16 may be designed to minimize their bezel areas where the two screens are hinged together thus allowing a large screen format to be used from the two screens.

In the embodiments, herein, the deployment of the screen 16 is optional giving the user flexibility when the user may choose or not choose to use the additional screen 16. The screen 16 is stored and hidden behind the device body, without appreciably changing the form-factor of the device body 12, in that the screen 16 is sized same or smaller than the device body and is of the order of 2 mm in thickness. In some or many modes of use of such devices, the screen 16 may not be used at all. However, based on user desires and preferences, the additional screen 16 is easily and conveniently available for use. The availability of additional screen 16 provides a distinct advantage in that the user need not switch back and forth between controls and displays on a single screen.

A computing and communication device has a portable device that has a body with a front side and a backside and a display screen (main screen) positioned on the front side. An additional display screen is attached to the backside of the device body and the backside stores and hides the additional display screen when not in use. The additional screen slides out, with the help of a slide mechanism, on a side from the device body to provide an additional display screen for use with the device.

The slide mechanism has two channels, one each, affixed on a top end and a bottom end of the backside of the device body. The channels hold in place and enable the additional screen to be slid in one direction inside the channel to slide out the additional screen for use with the device.

Alternatively, the additional screen is detached from the back of the device body and electrically interfaced to the device to provide an additional display screen for use with the device.

The additional screen has hinge mechanism that enables the additional screen to be oriented at multiple angles relative to the main screen, when slid out from the backside of the device. The additional screen is oriented at an adjustable angle relative to the main screen that provides for a one of a use-format of (i) a book reading format of the device, (ii) a laptop use-format of the device, and (iii) an enlarged flat screen. The additional screen is stowed away when not in use by making the relative angle zero and sliding the additional screen behind the device body.

The additional display screen has an electrical interface for interface to the computing device when the additional screen is used for display.

The device has an operating system function operating in the device, that senses a use and a stow states of the additional screen and programs the display logic of the operating system to use or not use both the screens for display. The operating system function may enable the main screen to function as a control mechanism and the additional screen as an additional display screen space.

A portable computing and communication device has a device body with dual screens, with a main screen on the body and an additional stow away display screen that is stowed behind the body that enables either the main screen or both the main screen and the additional screen when deployed to be used as display screens. A device body has a storage mechanism that stores the additional screen when not in use. The additional screen when deployed is hinged at different angles to the main screen to provide different use-formats of the device.

The device has an operating system function operating in the device, that senses a use and a stow states of the additional screen and programs the display logic of the operating system to use or not use both the screens for display. The operating system function may enable the main screen to function as a control mechanism and the additional screen as an additional display screen space.

With reference to FIG. 5B, a method for a portable computing and communication device has the following steps where all the steps may not be used or used in the order specified.

At step 100, providing a device body with dual screens, with a main screen on the body and an additional stow away display screen that is stowed behind the body;

At step 102, enabling either the main screen or both the main screen and the additional screen when deployed to be used as display screens.

At step 104, hinging the additional screen 16 at different angles relative to the main screen 14 that provides different use-formats of the device.

At step 106, hinging the additional screen when fully slid out to be hinged at an angle relative to the main screen, where the hinge angle includes, one of, 180, 165, 150, 135, 120, 105, 90, 75, and 60 degrees enabling a large screen orientation, a book orientation, or a laptop orientation to be formed between the main screen and the additional screen.

At step 108, providing a storage mechanism in the device body for storing the additional screen when not in use.

At step 110, sliding out the additional screen with a slide mechanism positioned at the back of the device body.

At step 112, sensing a use and a stow state of the additional screen by an operating system function operating in the device, and programming the display logic of the operating system to use or not use both the screens for display.

In summary, the embodiments herein are on apparatus and method that enable an additional screen 16 to be stowed behind a computing and communication device 10 and deployed for use when required to increase the display screen size and enable the device 10 to be used in different use-formats that may include, a two sided e-book, a laptop, a presentation format and a large screen format and to stow away and hide the additional screen when its use is not required.

Thus the apparatus and method provide a more user friendly and efficient use of computing and communication device 12 for viewing different types of digital content.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:
1. A computing and communication device comprising:
   a. a portable device that has a body with a front side and a backside and a display screen (main screen) positioned on the front side;
   b. an additional display screen that is positioned on the backside of the device body is positioned and stored entirely behind the device's backside and does not alter the length and width dimensions of the device and thus hides the additional display screen when not in use;
   c. the additional display screen is limited in thickness to be an eighth of an inch or less and thus does not substantially alter the thickness dimension of the device.
2. The device as in claim 1, comprising:
   the additional screen slides out, with the help of a slide mechanism, on a side from the device body to provide an additional display screen for use with the device.
3. The device as in claim 1, comprising:
   the additional screen is detached from the back of the device body and electrically interfaced to the device to provide an additional display screen for use with the device.
4. The device as in claim 2, comprising:
   the additional screen has hinge mechanism that enables the additional screen to be oriented at multiple angles relative to the main screen, when slid out from the backside of the device.
5. The device as in claim 4, comprising:
   the additional screen is oriented at an adjustable angle relative to the main screen that provides for a one of a use-format of (i) a book reading format of the device, (ii) a laptop use-format of the device, and (iii) an enlarged flat screen.
6. The device as in claim 2, comprising:
   the additional screen is stowed away when not in use by making the relative angle zero and sliding the additional screen behind the device body.
7. The device as in claim 1, comprising:
   the additional display screen has an electrical interface for interface to the computing device when the additional screen is used for display.
8. The device as in claim 2, comprising:
   a. the slide mechanism has two channels, one each, affixed on a top end and a bottom end of the backside of the device body;
   b. the channels hold in place and enable the additional screen to be slid in one direction inside the channel to slide out the additional screen for use with the device.
9. The device as in claim 1, comprising:
   an operating system function operating in the device, that senses a use and a stow states of the additional screen and programs the display logic of the operating system to use or not use both the screens for display.
10. The device as in claim 1, comprising:
    an operating system function that enables the main screen to function as a touch screen control mechanism and the additional screen as an additional display screen space.
11. A portable computing and communication device comprising:
    a. a device body with dual screens, with a main screen on the body and an additional stow away display screen that is stowed entirely behind the body in a manner that does not alter the length and width dimensions of the device and that enables either the main screen or both the main screen and the additional screen when deployed to be used as display screens;
    b. a storage mechanism in the device body that hides and stores the additional screen when not in use;
    c. the additional display screen is limited in thickness to be an eighth of an inch or less and thus does not substantially alter the thickness dimension of the device.
12. The device as in claim 11, comprising:
    the additional screen when deployed is hinged at different angles to the main screen to provide different use-formats of the device.
13. The device as in claim 11, comprising:
    an operating system function operating in the device, that senses a use and a stow states of the additional screen and programs the display logic of the operating system to use or not use both the screens for display.
14. The device as in claim 11, comprising:
    an operating system function that enables the main screen to function as a control mechanism and the additional screen as an additional display screen.
15. A method for a portable computing and communication device comprising the steps of:
    a. providing a device body with dual screens, with a main screen on the body and an additional stow away display screen and hiding and stowing the stow away screen entirely behind the body when not in use by a storage mechanism in the device body in a manner that does not alter the length and width dimensions of the device body;
    b. enabling either the main screen or both the main screen and the additional screen when deployed to be used as display screens;
    c. the additional display screen is limited in thickness to be an eighth of an inch or less and thus does not substantially alter the thickness dimension of the device.
16. The method as in claim 15, comprising:
    hinging the additional screen, when deployed, at different angles relative to the main screen that provides for different use-formats of the device.
17. The method as in claim 16, comprising:
    hinging the additional screen when fully slid out to be hinged at an angle relative to the main screen, where the hinge angle includes, one of, 180, 165, 150, 135, 120, 105, 90, 75, and 60 degrees enabling a large screen orientation, a book orientation, or a laptop orientation to be formed between the main screen and the additional screen.

18. The method as in claim 15, comprising:
providing a storage mechanism in the device body for storing the additional screen when not in use.

19. The method as in claim 15, comprising:
sliding out the additional screen with a slide mechanism positioned at the back of the device body.

20. The method as in claim 15, comprising:
sensing a use and a stow states of the additional screen by an operating system function operating in the device, and programming the display logic of the operating system to use or not use both the screens for display.

* * * * *